United States Patent [19]
Massée

[11] Patent Number: 5,901,595
[45] Date of Patent: May 11, 1999

[54] APPARATUS FOR MACHINING A WORKPIECE

[76] Inventor: Johan Massée, Vijfsprongweg 104, Lunteren, Netherlands, 6741 JC

[21] Appl. No.: 08/873,377

[22] Filed: Jun. 12, 1997

[30] Foreign Application Priority Data

Jun. 24, 1996 [NL] Netherlands ............................ 1003403

[51] Int. Cl.$^6$ ................................................... B21D 22/18
[52] U.S. Cl. ................................................... 72/81; 72/83
[58] Field of Search ...................... 72/10.1, 13.4, 72/81, 82, 83, 85; 364/474.17, 474.18; 382/152

[56] References Cited

U.S. PATENT DOCUMENTS

| | | | |
|---|---|---|---|
| 4,807,145 | 2/1989 | Takahashi et al. .................. | 364/474.17 |
| 5,255,199 | 10/1993 | Barkman et al. ................... | 365/474.17 |
| 5,363,185 | 11/1994 | Zana ............................................. | 356/2 |
| 5,419,222 | 5/1995 | Bieg ........................................ | 82/1.11 |

FOREIGN PATENT DOCUMENTS

| | | |
|---|---|---|
| 0 125 720 | 11/1984 | European Pat. Off. . |
| 40 27 921 A1 | 4/1991 | Germany . |
| 1-218721 | 8/1989 | Japan .......................................... 72/83 |

Primary Examiner—Lowell A. Larson
Attorney, Agent, or Firm—Westman, Champlin & Kelly, P.A.; S. Koehler

[57] ABSTRACT

An apparatus for machining a workpiece comprises means for clamping the workpiece, means for rotatingly driving the clamped workpiece, a tool for machining the workpiece, the tool having a part for engaging the workpiece, a tool holder, means for moving the tool holder with respect to the clamping means and a control unit with a memory for one or more control programs. The control unit is arranged to control the moving means according to a control program by means of measuring means providing the x,y-positions of the tool holder in such a manner that the tool follows a desired path along the clamping means for machining the workpiece. The apparatus comprises a measuring device located at a predetermined reference position with respect to the moving means. The control unit is arranged to control the moving means in such a manner that said tool part is moved along to the measuring device, wherein the measuring device delivers a measuring signal to the control unit, wherein the control unit determines the shape of said tool part and the position thereof with respect to the tool holder directly from the x,y-positions provided by the x,y-measuring means and stores these x,y-positions in the memory for use in the (each) control program for the corresponding tool.

19 Claims, 4 Drawing Sheets

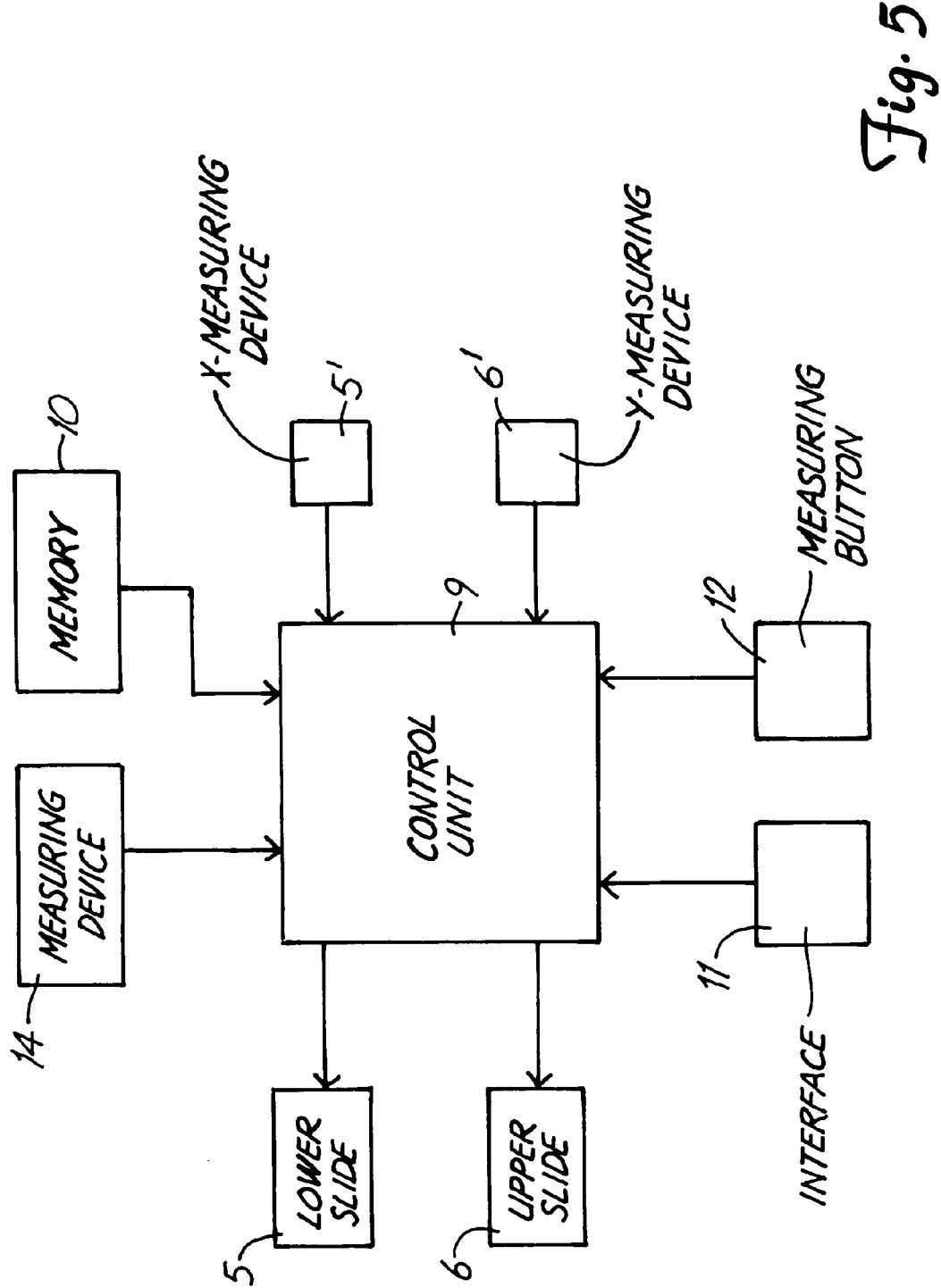

5,901,595

APPARATUS FOR MACHINING A WORKPIECE

BACKGROUND OF THE INVENTION

The invention relates to an apparatus for machining a workpiece, comprising means for clamping the workpiece, means for rotatingly driving the clamped workpiece, a tool for machining the workpiece, said tool having a part for engaging the workpiece, a tool holder, means for moving the tool holder with respect to the clamping means, measuring means for measuring the position of the tool holder in a x- and a y-direction, and a control unit with a memory for one or more control programs, in which one or more paths of movement of the tool holder are stored as x,y-positions thereof. The control unit is arranged to control the moving means according to a control program by means of the x,y-positions provided by said x,y-measuring means in such a manner that the tool follows a desired path along the clamping means for machining the workpiece. A measuring device can be located at a predetermined reference position with respect to the moving means for measuring the contour of said tool part. The control unit is arranged to compare this shape with a previously stored shape of said tool part. The control unit adapts the control program for the corresponding tool if differences are found.

Such apparatus are known in different embodiments and can be made for shaping the workpiece by removing material or not. Known apparatus are for example lathes, spinning machines or the like. In the known apparatus a control program is generally stored in the memory during a teaching phase, whereafter during the production phase the control unit controls the moving means in accordance with the control program, so that the tool is moved according to the desired path along the clamping means, and thereby, along the clamped workpiece for obtaining the desired machining of the workpiece. In, a known apparatus the problem arises in that with a change of the tool or machining of the tool, the position of the part of this tool engaging the workpiece and the shape thereof do not correspond anymore with the position and shape during the teaching phase. It is then necessary to repeat the teaching phase to establish a new control program.

U.S. Pat. No. 5,255,199 discloses an apparatus of the above-mentioned type, wherein it is attempted to avoid this disadvantage by adding a camera and a vision computer to the apparatus. To obtain an image of the tool, the tool is moved into a reference position. The vision computer can compute a contour of the tool from the image obtained. In this known apparatus, complicated computations are necessary to alter the control program in case of a possible change of the contour of the tool, whereas moreover, a calibration of the vision computer on the control unit, i.e. the x,y-measuring means, is required. In this known apparatus, computation errors lead to manufacturing errors of the product to be manufactured, whereas changes in the x,y-measuring means require a new calibration or lead to further manufacturing errors. Moreover, temperature appears to have a relatively high effect on the accuracy of the known apparatus.

SUMMARY OF THE INVENTION

It is an object of the invention to provide an improved apparatus of the above-mentioned type.

To this end the invention provides an apparatus of the above-mentioned type, wherein, for measuring the contour of said tool part, the control unit controls the moving means by means of the x,y-positions provided by the x,y-measuring means in such a manner that said tool part is moved with respect to the contour measuring device. The control unit determines the shape of said tool part and the position thereof with respect to the tool holder directly from the x,y-positions received from the x,y-measuring means and stores said shape and position in the memory for use in the control program for the corresponding tool.

In this manner, an apparatus is obtained wherein for measuring the contour of the tool or the tool part engaging the workpiece, respectively, the available measuring means for measuring the x,y-positions are advantageously used, so that the contour of the tool part is directly known in the form of x,y-position without any computation. As the movement paths of the tool holder are stored in the form of x,y-positions, a simple processing of changes in the contour of the tool part to adapt the control programs is possible. Moreover, calibration of the measuring device for the contour on the x,y-measuring means is not necessary and, in case of a replacement or the like of the x,y-measuring means, a new measurement of the contour of the tool part is sufficient to alter the control programs, if necessary.

BRIEF DESCRIPTION OF THE DRAWINGS

The invention will be further explained by reference to the drawings in which an embodiment of the apparatus of the invention is schematically shown.

FIG. 5 is a block diagram of the control unit of the apparatus of FIG. 1.

DETAILED DESCRIPTION OF THE PREFERRED EMBODIMENT

Figure 1:
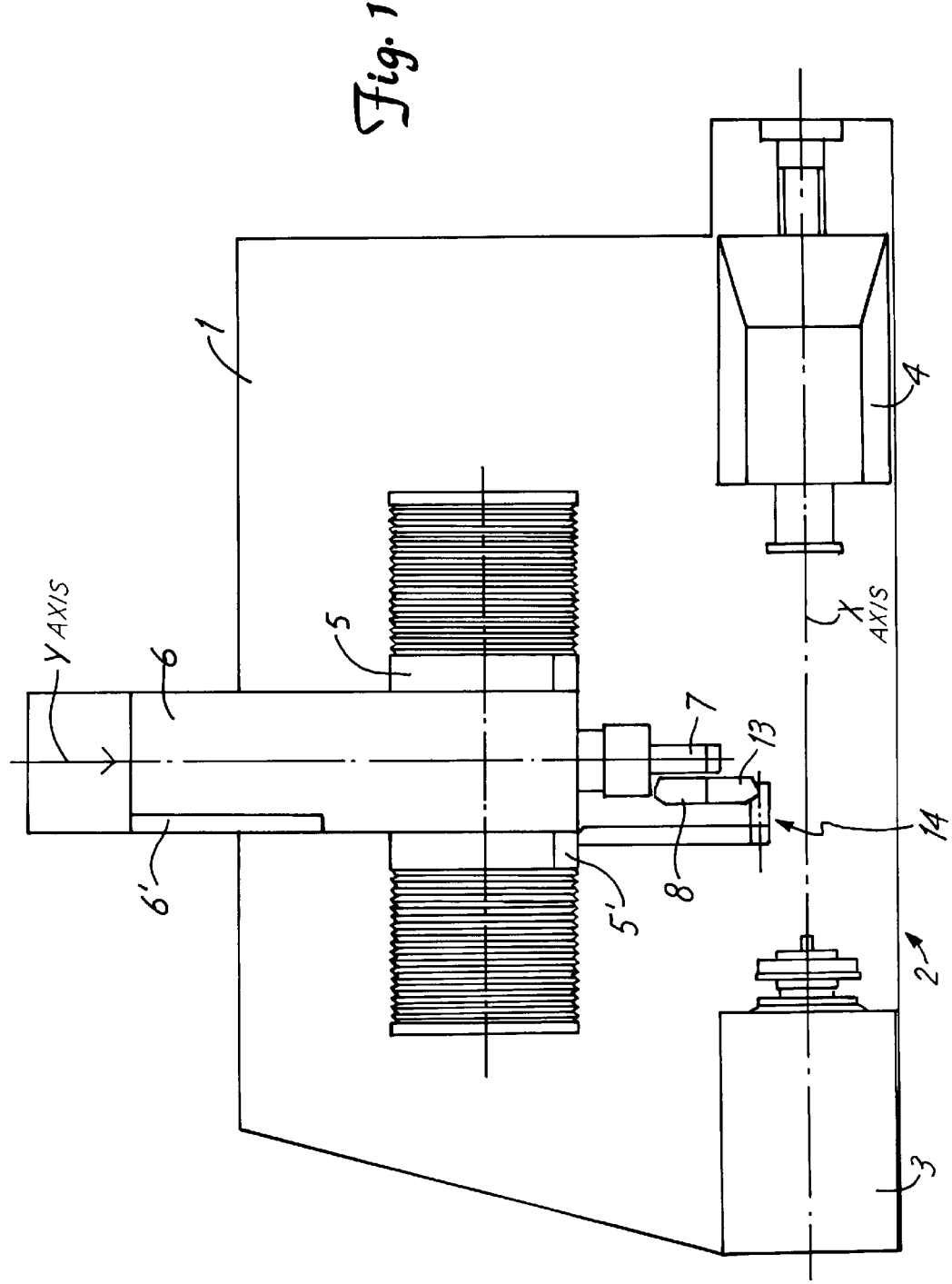
FIG. 1 is a top view of an embodiment of the apparatus according to the invention, which is made as a spinning machine.

FIG. 1 shows a top view of a spinning machine comprising a machine bed 1 supporting means 2 for clamping a workpiece. The workpiece is for example a metal sheet which may be pre-shaped or not, wherein a lamp reflector, for example, must be made of this metal sheet. These clamping means 2 comprise in this case a support 3 for a chuck not shown and a driving unit 4 movable with respect to the support 3. The driving unit 4 can press the workpiece against the chuck.

Further the spinning machine comprises a lower slide 5 and an upper slide 6 mounted transverse to the lower slide 5 and carrying a tool holder 7. A forming roller 8 is rotatably mounted on the tool holder 7 as a tool.

The lower slide 5 carries a x-measuring means 5' and the upper slide carries a y-measuring means 6' for measuring the x,y-positions of the tool holder 7.

It will be clear that by moving the slides 5 and 6 according to the indicated axes x and y, the forming roller 8 can be moved in accordance with any desired path along the clamping means 2. The control of the slides 5, 6 occurs by means of a control unit 9 schematically shown in FIG. 5 and comprising at least a microprocessor and a memory 10. The x,y-measuring means 5' and 6' are connected to the control unit 9 so that this control unit continuously knows the x,y-positions of the tool holder 7. For a further explanation of a spinning machine reference is made to EP-A-0 125 720 of the applicant, which application is deemed to be incorporated by reference.

By means of suitable interfare 11 an operator can operate the slides 5, 6 in such a manner that the forming roller 8 follows one or more desired paths along the clamping means 2 in order to spin the workpiece on the chuck to obtain a desired product. The path(s) followed are stored in a control program in the form of x,y-position values measured by the measuring means 5', 6', so that the control unit 9 can be switched to an automatic production phase, wherein the control unit a controls the moving means 5, 6 by means of the measuring means 5', 6' in accordance with the stored control program and the tool 8 is automatically moved in accordance with the desired path(s) along the clamping means 2.

Figure 3:
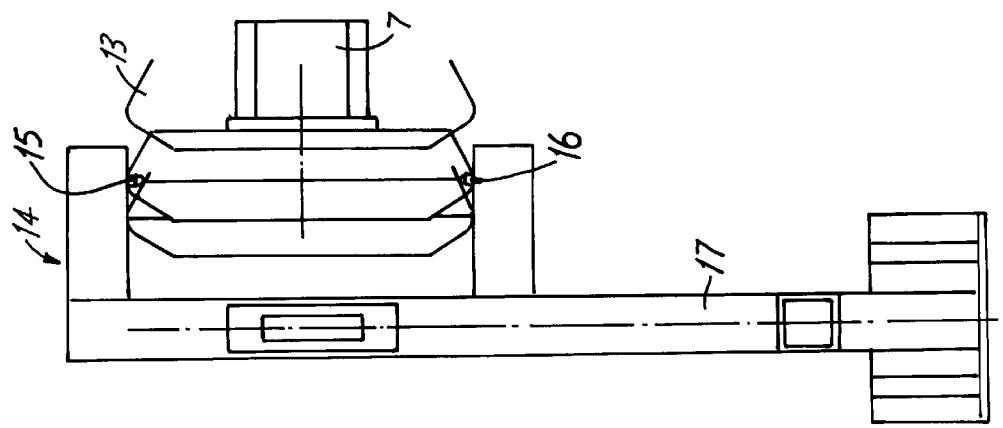

Before the teaching phase a measuring phase, is executed in the apparatus described, which measuring phase is started by operating a measuring button 12. In this measuring phase the control unit 9 controls the slides 5, 6 by means of the measuring means 5', 6' in such a manner that the forming roller 8, in particular the part 13 thereof engaging the workpiece during spinning, is moved along a contour measuring device 14. With the aid of the measuring device 14, the control unit 9 can measure directly the shape or contour of the part 13 and the location thereof with respect to the slides 5, 6 in the form of x,y-positions of the tool holder 7 by means of the x,y-measuring means 5', 6'. In the embodiment shown in FIG. 3 the measuring device 14 comprises a laser diode 15 and a receiver 16 located at a distance from each other in such a manner that the part 13 of the forming roller 8 can be brought between the laser diode 15 and the receiver 16.

Figure 2:
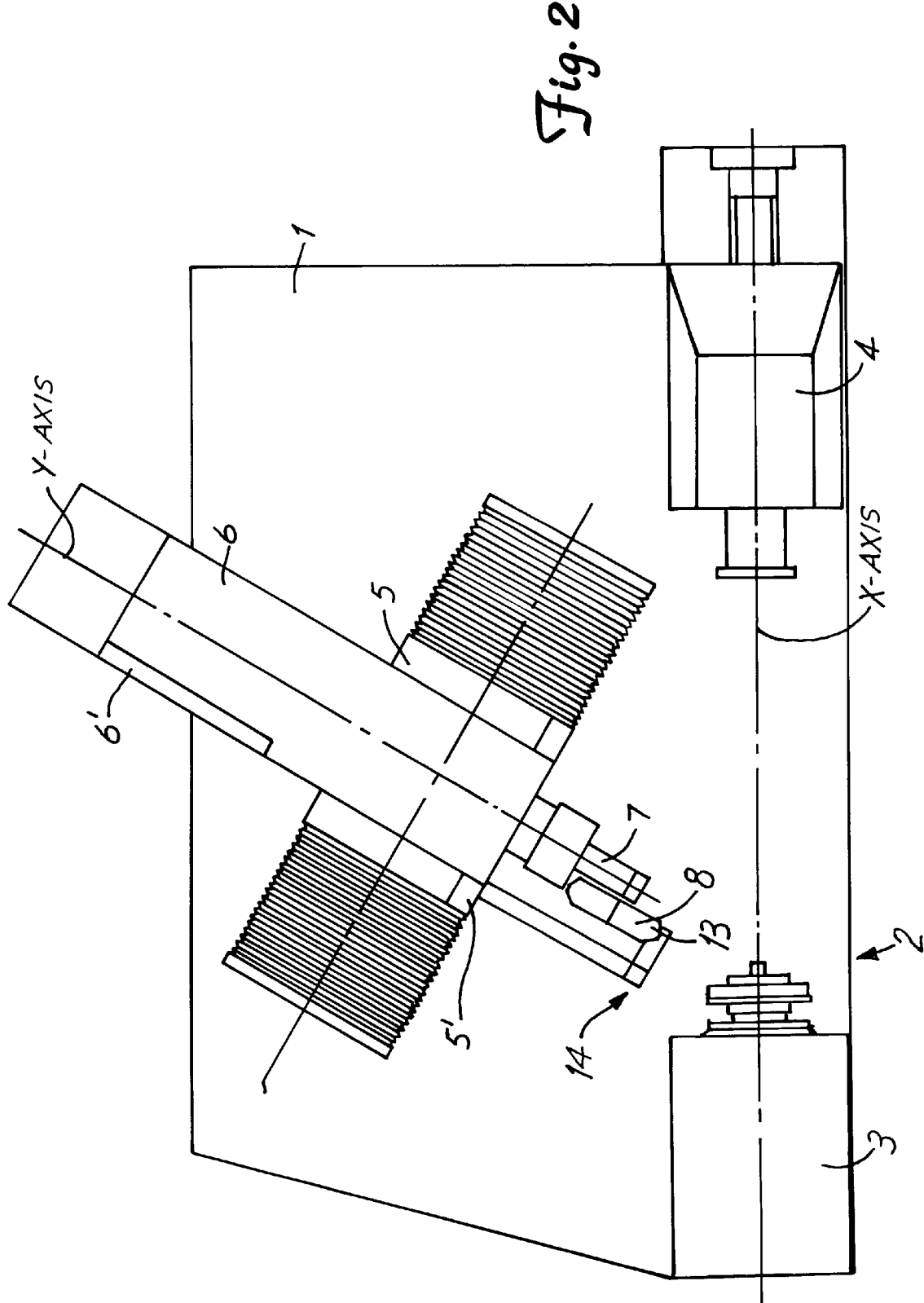
FIG. 2 is a top view of the apparatus of FIG. 1, wherein the lower slide is in a different position with respect to the clamping means.
Figure 4:
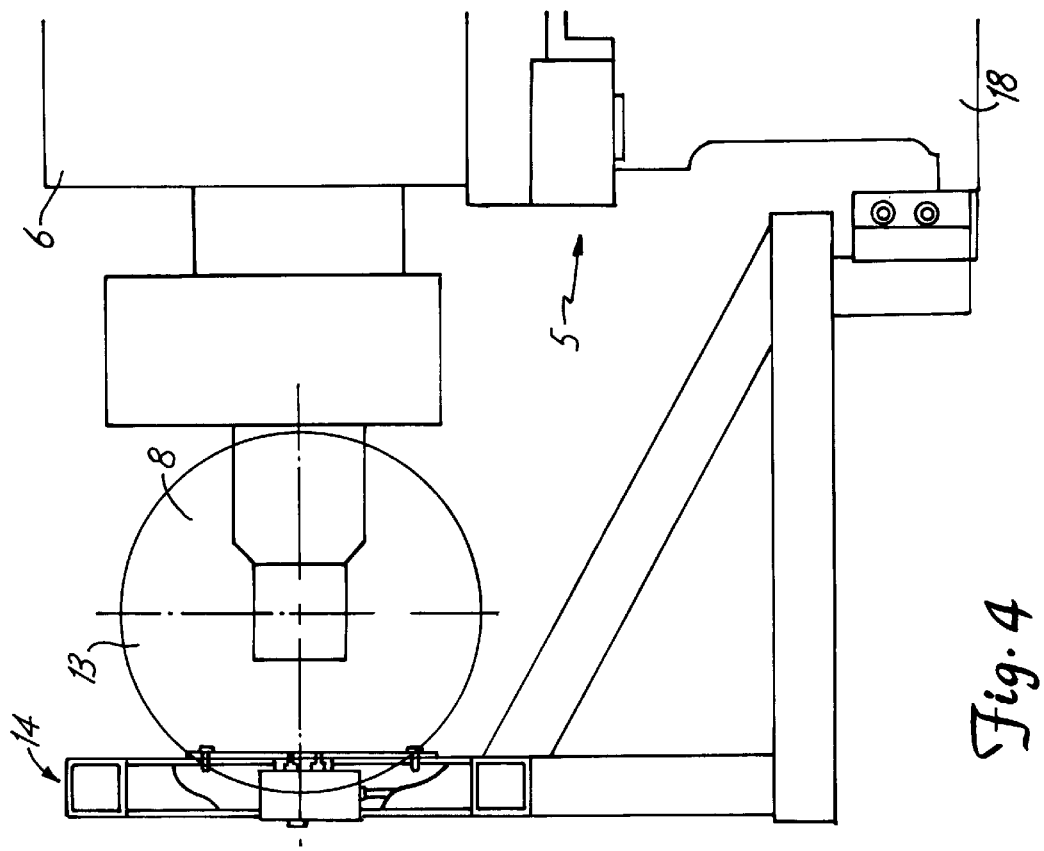
FIGS. 3 and 4 show a front view and a side view, respectively, of a part of the apparatus of FIG. 1 at a larger scale.

The laser diode 15 and the receiver 16 are supported on a carrier 17 which can be detachably coupled with the stationary part 18 of the lower slide 5 as illustrated in FIG. 4. When the carrier 17 is coupled with the stationary part 18 of the lower slide 5, the measuring device 14 will always be at a predetermined reference position with respect to the slides 5 and 6. In FIG. 2 the lower slide 5 is moved in a different position with respect to the machine bed 1, by way of example; however, the position of the measuring device 14 with respect to the slides 5 and 6 remains unchanged. Thereby it is obtained that, by controlling the slides 5, 6, the control unit 9 always moves the forming roller 8 in the same manner along the measuring device 14 independent of the position of the lower slide 5 with respect to the machine bed 1. By moving the forming roller 8 along the measuring device 14, the receiver 16 delivers a signal to the control unit 9, whereby the control unit 9 in effect scans the contour of the part 13 with the measuring device 14. By means of the measuring means 5', 6', the control unit 9 can directly determine the contour of the part 13 and the position of the part 13 with respect to the holder 7 in the form of x,y-positions. The shape and position are stored as x,y-positions in the memory 10 by the control unit 9. Then the teaching phase is executed in a usual manner, in which a control program is stored in the memory 10. It is noted that in the described embodiment, the measuring device 14 is removed before switching to the teaching phase. Thereafter, the spinning machine can manufacture products in accordance with this control program in the production phase.

For the sake of completeness, it is noted that a control program should always be executed with the lower slide 5 in the position with respect to the machine bed 1, in which the corresponding control program has been teached.

Now when the forming roller 8 is changed, it is not certain anymore that the forming roller 8, in particular the part 13 thereof, will be at the same position with respect to the tool holder 7 and the slides 5, 6, respectively. It may also happen that the part 13 of the forming roller 8 must be machined, for example if the forming roller is damaged. In that case, the position of the part 13 of the forming roller 8 with respect to the tool holder 7 and the contour of the part 13 can be changed.

In case of a change or machining of the forming roller 8 it is not necessary anymore to execute a new teaching phase with the apparatus described, because the control unit 9 after operating the measuring button 12 will execute a new measurement of the contour and of the position of the part 13 of the forming roller 8. Then, the control unit 9 compares the new x,y-measuring values with the values stored in the memory 10 during a previous measurement and, if differences are found, the control unit will change the corresponding control program in such a manner that the part 13 of the forming roller 8 engaging the workpiece, will nevertheless follow the desired path along the clamping means 2. Thereby the production time of the apparatus described can be increased significantly.

Although in the described embodiment of the spinning machine a laser diode 15 and separate receiver 16 are used, it is also possible to use a combined laser diode/receiver or other suitable measuring means for measuring the shape and position of the part 13 of the forming roller 8. As suitable measuring means can be mentioned for example capacitive measuring means, scanning means with mechanical feelers or photographic measuring means, wherein photographic images of the tool are used. In case of photographic or video images of the tool, the control unit 9 controls the moving means 5, 6 in such a manner that the contour of the tool part 13 fits as accurately as possible within the earlier measured contour, wherein by means of the x,y-measuring means 5', 6' corresponding x,y-positions are directly determined again. Further, it is noted that instead of a spinning machine the apparatus described can also be made as a material removing apparatus, for example a lathe.

Therefore the invention is not restricted to the above-described embodiment which can be varied in a number of ways within the scope of the claims.

What is claimed is:

1. An apparatus for machining a workpiece, comprising means for clamping the workpiece, means for rotatingly driving the clamped workpiece, a tool for machining the workpiece, said tool having a part for engaging the workpiece, a tool holder, moving means for moving the tool holder with respect to the clamping means, measuring means for measuring the position of the tool holder in a x- and y-direction, and a control unit with a memory for at least one control program, in which one or more paths of movement of the tool holder are stored as x,y-positions therein, wherein the control unit is arranged to control the moving means according to the control program by means of the x,y-positions provided by said x,y-measuring means in such a manner that the tool follows a desired path, wherein a contour measuring device is disposed at a selected reference position with respect to the moving means for measuring a contour of said tool part, wherein the control unit is arranged to compare the contour with a previously stored contour of said tool part and wherein the control unit adapts each control program for the tool if differences are found, wherein for measuring the contour of said tool part, the control unit controls the moving means by means of the x,y-positions provided by the x,y-measuring means in such a manner that said tool part is moved with respect to the contour measuring device, wherein the control unit determines the contour of said tool part and the position thereof with respect to the tool holder directly from the x,y-positions received from the x,y-measuring means and stores said contour and position in the memory for use in the control program for the tool.

2. The apparatus according to claim 1, wherein the control unit is arranged to store a control program for obtaining a desired path of the tool by manual operation, wherein also the contour and position of the tool used are stored in the control program.

3. The apparatus according to claim 1, wherein the control unit is arranged to execute a new measurement of the contour and position of said tool part at each change or alternation of the tool.

4. The apparatus according to claim 1, wherein the contour measuring means can be mounted detachably in the apparatus.

5. The apparatus according to claim 1, wherein the contour measuring device is provided with a laser diode and a receiver.

6. The apparatus according to claim 1, wherein the apparatus is made as a spinning machine.

7. An apparatus for machining a workpiece, the apparatus comprising:

a base;

a workpiece driver joined to the base for moving a workpiece;

a tool holder;

a tool coupleable to the tool holder and engageable with the workpiece;

a moving device coupled to the tool holder to move the tool holder;

a measuring device for measuring a position of the tool holder in x,y-positions;

a contour measuring device disposed at a selected reference position for measuring a contour of the tool;

a control unit coupled to the mover, the measuring device and the contour measuring device and having memory for at least one control program having a path of movement of the tool holder stored as x,y-positions, wherein the control unit adapts the control program as a function of comparing a contour of the tool with a previously stored contour, and wherein the control unit determines the contour of said tool directly from the x,y-positions received from the measuring device, the control unit being arranged to control the moving device according to the path from x,y-positions received from the measuring device.

8. The apparatus of claim 7 wherein the control unit determines a position of the tool directly from x,y-positions received from the measuring device and stores said position in memory.

9. The apparatus of claim 7 wherein the contour measuring device is removably secured proximate the tool.

10. The apparatus of claim 9 wherein the contour measuring device is removably secured to the moving device.

11. The apparatus of claim 10 wherein the moving device comprises a first slide assembly for moving the tool holder along an x-axis, and a second slide assembly for moving the tool holder along a y-axis transverse to the x-axis.

12. The apparatus of claim 11 wherein the contour measuring device is removably secured to one of the slide assemblies.

13. The apparatus of claim 7 wherein the contour measuring device comprises at least one of a laser diode/receiver, a capacitive sensor, a scanner with mechanical feelers, and an image scanner.

14. An apparatus for machining a workpiece, the apparatus comprising:

a base;

a workpiece driver joined to the base for moving a workpiece;

a tool holder;

a tool coupleable to the tool holder and engageable with the workpiece;

a moving device coupled to the tool holder to move the tool holder;

a measuring device for measuring a position of tool holder in x,y-positions;

a tool position measuring device disposed at a selected reference position for measuring a position of the tool with respect to the tool holder; and a control unit coupled to the mover, the measuring device and the tool position measuring device and having memory for at least one control program having a path of movement of the tool holder stored as x,y-positions, wherein the control unit adapts the control program as a function of comparing a position of the tool with respect to the tool holder with a previously stored position, and wherein the control unit determines the position of said tool with respect to the tool holder directly from the x,y-positions received from the measuring device, the control unit being arranged to control the moving device according to the path from x,y-positions received from the measuring device.

15. The apparatus of claim 14 wherein the tool position measuring device is removably secured proximate the tool.

16. The apparatus of claim 15 wherein the tool position measuring device is removably secured to the moving device.

17. The apparatus of claim 16 wherein the moving device comprises a first slide assembly for moving the tool holder along an x-axis, and a second slide assembly for moving the tool holder along a y-axis transverse to the x-axis.

18. The apparatus of claim 17 wherein the tool position measuring device is removably secured to one of the slide assemblies.

19. The apparatus of claim 14 wherein the tool position measuring device comprises at least one of a laser diode/receiver, a capacitive sensor, a scanner with mechanical feelers, and an image scanner.

* * * * *

UNITED STATES PATENT AND TRADEMARK OFFICE
CERTIFICATE OF CORRECTION

PATENT NO. : 5,901,595

DATED : May 11, 1999

INVENTOR(S) : Johan Massée

It is certified that error appears in the above-identified patent and that said Letters Patent is hereby corrected as shown below:

Column 5, line 17, change "means" to --device--.

Column 5, line 39, change "mover" to --moving device--.

Column 6, line 29, change "mover" to --moving device--.

Signed and Sealed this

Twenty-first Day of September, 1999

Attest:

Q. TODD DICKINSON

Attesting Officer     Acting Commissioner of Patents and Trademarks